United States Patent [19]
Stetson et al.

[11] Patent Number: 5,242,488
[45] Date of Patent: Sep. 7, 1993

[54] COATING COMPOSITION AND METHOD OF FORMING

[75] Inventors: Alvin R. Stetson; William D. Brentnall; Zaher Z. Mutasim, all of San Diego, Calif.

[73] Assignee: Solar Turbines Incorporated, San Diego, Calif.

[21] Appl. No.: 891,098

[22] Filed: Jun. 1, 1992

[51] Int. Cl.$^5$ .............................................. C09D 5/08
[52] U.S. Cl. ........................ 106/14.12; 106/14.05; 106/14.11; 252/387
[58] Field of Search ............... 106/14.05, 14.11, 14.12; 252/387

[56] References Cited

U.S. PATENT DOCUMENTS

| | | | |
|---|---|---|---|
| 3,248,249 | 4/1966 | Collins, Jr. ........................... | 106/286 |
| 3,248,251 | 4/1966 | Allen .................................... | 106/286 |
| 4,319,924 | 3/1982 | Collins, Jr. et al. .............. | 106/14.12 |
| 4,537,632 | 8/1985 | Mosser .............................. | 106/14.12 |
| 4,617,056 | 10/1986 | Mosser et al. ...................... | 106/1.12 |
| 4,650,699 | 3/1987 | Mosser et al. ...................... | 427/240 |
| 4,659,613 | 4/1987 | Mosser et al. ...................... | 428/215 |
| 4,699,839 | 10/1987 | Hornberger ...................... | 428/312.8 |
| 4,724,172 | 2/1988 | Mosser et al. ..................... | 427/383.5 |
| 4,863,516 | 9/1989 | Mosser et al. ..................... | 106/14.12 |
| 4,889,558 | 12/1989 | Mosser .............................. | 106/14.12 |
| 5,066,540 | 11/1991 | Mosser et al. ..................... | 106/14.12 |

*Primary Examiner*—Mark L. Bell
*Assistant Examiner*—Anthony J. Green
*Attorney, Agent, or Firm*—Robert A. McFall

[57] ABSTRACT

A coating composition for ferrous metal alloy surfaces comprises a slurry consisting essentially of an aluminum neutralized phosphate bonding solution and aluminum powder. A process for forming the bonding solution component of the coating slurry includes equilibrating an aqueous phosphate solution with a small but controlled and necessary amount of solute aluminum prior to adding aluminum powder to form the slurry. The bonding solution preferably also contains magnesium. The present invention overcomes the problem of bonding solutions which require environmentally disadvantageous chromates or molybdates to neutralize the bonding solution prior to formation of the slurry.

14 Claims, No Drawings

COATING COMPOSITION AND METHOD OF FORMING

TECHNICAL FIELD

This invention relates generally to a corrosion and oxidation resistant coating composition for ferrous alloy surfaces and a method of forming said coating, and more particularly to a chromium and molybdenum free phosphate-aluminum powder slurry coating composition and a method for forming.

BACKGROUND ART

Aluminum metal-phosphate coating compositions for protecting ferrous metal alloy surfaces from oxidation and corrosion, particularly at high temperatures, are well known in the art. For example, U.S. Pat. No. 3,248,251 issued Apr. 26, 1966 to Charlotte Allen teaches a coating composition containing chromium and/or molybdenum to inhibit the reaction between an aqueous, acidic, phosphate component of the composition and a solid particulate metallic material, preferably aluminum powder.

Heretofore, phosphate-aluminum powder coating compositions for protecting ferrous alloy surfaces from oxidation and corrosion have been based on an acid-base reaction to neutralize the bonding solution and contain either hexavalent chromium or molybdenum to inhibit the oxidation of metallic aluminum. Both the hexavalent chromium and molybdenum are considered toxic chemicals and are therefore environmentally disadvantageous. In particular, hexavalent chromium is rated as a carcinogen. Molybdenum is classified as a toxic heavy metal.

The present invention is directed to overcoming the problems set forth above. It is desirable to have a high-temperature oxidation and corrosion-resistant coating for ferrous metal alloy surfaces that does not require either chromates or molybdates to control the reaction between the bonding solution and the powdered metal, e.g., aluminum. Furthermore, it is desirable to have a bonding solution and slurry mixture of such coatings that are free of both chromium and molybdenum.

DISCLOSURE OF THE INVENTION

In accordance with one aspect of the present invention, a coating composition for ferrous metal alloy surfaces consists essentially of a mixture of a bonding solution and aluminum powder, in a ratio of about 100 ml of the bonding solution to from about 80 to about 150 g of the aluminum powder. The bonding solution consists essentially, by weight, of about 47% to about 74% $H_2O$, about 27% to about 39% $H_3PO_4$, less than about 20% of at least one magnesium compound selected from the group comprising $MgCO_3$ and $MgO$, and aluminum in solution in an amount sufficient to substantially equilibrate said bonding solution with respect to aluminum.

In another aspect of the present invention, a method of forming a slurry coating for ferrous alloy surfaces, comprises mixing together about 500 to about 800 parts by weight water and about 345 parts by weight phosphoric acid. Aluminum, either as a metallic powder or a compound, is added in an amount sufficient to substantially equilibrate the bonding solution with respect to aluminum. Magnesium, either as a carbonate or oxide in an amount less than about 200 parts by weight, may also be added to the mixture. The mixture is then stirred, or agitated, for a period of time sufficient to permit completion of the reaction of the added compounds with phosphoric acid and form a neutralized solution that is substantially equilibrated with respect to aluminum. The neutralized solution is then mixed with aluminum powder to form a slurry containing about 80 g to 50 g of aluminum powder for each 100 ml of the neutralized solution.

BEST MODE FOR CARRYING OUT THE INVENTION

In the preferred embodiment of the present invention, a coating composition for ferrous metal surfaces consists essentially of a bonding solution neutralized by an oxidation-reduction reaction, and finely divided aluminum particles.

The bonding solution component of the coating embodying the present invention requires that it contain sufficient aluminum in solution so that it is substantially equilibrated with respect to aluminum, i.e., that the amount of aluminum in solution be substantially at the saturation point and therefore essentially inert with respect to any subsequent additions of aluminum. Because of its faster reaction time, aluminum powder is the preferred form of aluminum although other sources of aluminum, such as alumina ($Al_2O_3$) or aluminum hydroxide ($Al[OH]_3$) may also be used to provide equilibration of the bonding solution. If alumina or aluminum hydroxide are selected, it is desirable to heat the mixture to increase the reaction rate. Magnesium, while not essential, may desirably be used to at least partially neutralize the aqueous phosphoric acid mixture either before or after equilibration of the mixture with aluminum.

Preferably, the bonding solution includes either magnesium carbonate ($MgCO_3$) or magnesium oxide ($MgO$), and has a composition consisting essentially of, by weight, from about 47% to about 74% $H_2O$, from about 27% to about 39% $H_3PO_4$, less than about 20% of either $MgCO_3$ or $MgO$ and from about 0.5% to about 3.5% aluminum in solution. If magnesium, either as a carbonate or oxide, is not used as an aid to neutralization of the bonding solution, aluminum in amounts represented by the upper limits of the above stated ranges will be required to sufficiently neutralize the phosphoric acid solution and also equilibrate the solution with respect to aluminum.

More specifically, when $MgCO_3$ is used as a neutralizing agent, the bonding solution desirably has a composition consisting essentially of, by weight, from about 47% to about 67% $H_2O$, from about 27% to about 35% $H_3PO_4$, no more than about 20% $MgCO_3$ and from about 0.5% to about 3.5% aluminum in solution. Preferably, the magnesium carbonate neutralized bonding solution consists essentially of, by weight, about 62% $H_2O$, about 27% $H_3PO_4$, about 9% $MgCO_3$, and about 2% aluminum powder. When, $MgO$ (magnesia) is used as the neutralizing agent, the composition desirably consists essentially of, by weight, from 52% to about 74% $H_2O$, from about 30% to about 39% $H_3PO_4$, no more than about 10% $MgO$ and from about 0.5% to about 3.5% aluminum in solution, and preferably, about 65% $H_2O$, about 28% $H_3PO_4$, about 5% $MgO$, and about 2% aluminum powder.

In one embodiment of the present invention, the bonding solution component is formed by diluting phosphoric acid ($H_3PO_4$) in a ratio, in parts by weight, of from about 500 to 800 parts of water with 345 parts of phosphoric acid. If the ratio is less than 500 parts of water to 345 parts phosphoric acid, the solution becomes very thick whereas if the ratio is more than about 800 parts of water to the same amount of phosphoric acid, the solution becomes overly weakened. Preferably, 345 parts of phosphoric acid are mixed with about 780 parts of water.

After dilution, aluminum, preferably as an atomized powder, is added to aqueous phosphoric acid mixture in an amount to substantially equilibrate the mixture with respect to aluminum. This requires only a relatively small amount of powdered aluminum, for example from about 10 to about 70 parts by weight be added to the mixture. If an aluminum compound is selected to provide solute aluminum in the mixture, amounts of such compounds should be added to provide from about 0.5% to about 3.5% aluminum in solution. Also, to promote faster reaction times, it is desirable to heat the mixture if the source of aluminum is a compound such as alumina or aluminum hydroxide.

After the addition of aluminum, either magnesium carbonate or magnesium oxide, or mixture thereof, is desirably added to the water-phosphoric acid mixture. If magnesium carbonate is selected, less than 200 parts, by weight, and preferably about 120 parts, are added to the diluted phosphoric acid mixture. If magnesium oxide (magnesia) is selected, less than 100 parts, by weight, and preferably about 60 parts, are added. The solution is then stirred until the reaction of the magnesium compounds with the phosphoric acid solution is substantially complete.

Alternatively, the bonding solution may be formed by first mixing the magnesium compound with the aqueous phosphoric mixture and then adding aluminum. The order of addition of the components comprising the bonding solution is not critical. When added to the magnesia-phosphate mixture, only about 20 parts, by weight, of powdered aluminum are required to assure the final equilibration of the bonding solution. Considerably more aluminum, about 70 parts by weight, are required if the mixture is not partially neutralized with magnesium, i.e., if the aluminum is added directly to the aqueous phosphate acid mixture.

Irrespective of the order of addition, after addition of the aluminum, or aluminum compound, the mixture is stirred vigorously to assure dispersion of the adduct aluminum and then allowed to stand for a period of time sufficient to fully react the aluminum with the solution. This reaction equilibrates the bonding solution with respect to aluminum so that it is essentially inert when powdered aluminum is subsequently combined with the bonding solution to form a slurry. At the end of the required equilibration period, typically about 8 to 20 hours, desirably there is a small amount of undissolved aluminum at the bottom of reaction container. The presence of the unreacted or precipitated aluminum or aluminum compound indicates that the reaction has gone to completion and equilibration has been reached. The bonding solution may be easily separated from the undissolved particles by decantation.

The slurry coating embodying the present invention is then formed by mixing the above described neutralized bonding solution with very fine atomized aluminum powder, desirably having a nominal particle size of no more than about 45 μm and preferably a mean particle size of about 3 μm to 8 μm. The aluminum powder is added to the bonding solution in amounts to provide a ratio of from about 80 g to about 150 g of the aluminum powder for each 100 ml of the bonding solution. Preferably, the slurry contains about 125 g of aluminum powder for each 100 ml of bonding solution.

By the present invention, it has been discovered that the bonding solution must be substantially equilibrated with respect to aluminum prior to forming a slurry mixture with powdered aluminum, i.e., that the bonding solution be essentially inert with respect to any further reaction with aluminum when contacted with the large amount of aluminum powder in the slurry. The shelf life of the slurry coating composition embodying the present invention is comparable to the shelf life of slurries made with molybdate inhibitors, i.e., up to one week. However, it is recommended that only the amount of slurry anticipated to be applied within eight hours be prepared in advance of application.

The slurry is typically applied to a ferrous metal alloy surface, such as 12% stainless steel, by dipping or spraying, with spraying being the preferred process. The slurry is preferably applied in two coats, each about 0.00125 inch (0.032 mm) in thickness, dried at 180° F. (82° C.) for 15 to 30 minutes and cured at 650° F. (343° C.) for 30 to 60 minutes between each coat. The coatings, as cured, are not electrically conductive and therefore cannot provide galvanic protection against corrosion of the underlying substrate material. However, the coatings can be made electrically conductive by bead peening or by heating as specified in MIL-C-8175B specification. Thus, the coatings can, by mechanical or thermal processes, be made electrically conductive and thereby provide galvanic as well as barrier protection of the underlying ferrous alloy metal substrate.

Desirably, after the second coating is applied, dried, cured and processed to make it electrically conductive, the surface of the coating is sealed with the bonding solution to further increase the oxidation and corrosion protection provided by the coating, and to decrease the rate of consumption of aluminum in the coating during service. The seal coats are dried and cured at the same time and temperature as the above described slurry coatings.

INDUSTRIAL APPLICABILITY

The chrome and molybdenum-free coatings embodying the present invention are particularly useful for providing corrosion and oxidation protection to ferrous metal alloy surfaces operating at elevated service temperatures, such as the compressor blades of gas turbine engines.

A number of test specimens were prepared to compare the coating embodying the present invention with current commercially available and accepted coatings, all of which undesirably contain chromium or molybdenum. After application of 2 coats of the respective slurries, at least one seal coat of the respective bonding solution was applied to the surface of the second coat.

The test specimens were inspected for surface appearance and roughness, and tested for conductivity, mechanical properties including resistance to spalling and bond strength, thermal stability, resistance to corrosion, and resistance to corrosion at elevated temperatures. The coatings embodying the present invention were found to be at least equal to, and in many instances superior to, the coatings containing chromates or molybdates.

Other aspects, objects and advantages of this invention can be obtained from a study of the disclosure and the appended claims.

We claim:

1. A coating composition for ferrous metal alloy surfaces, consisting essentially of a slurry mixture of a bonding solution and aluminum powder in a ratio of about 100 ml of the bonding solution to from about 80 g to about 150 g of the aluminum powder, said bonding solution consisting essentially of, by weight, from about 47% to about 74% $H_2O$, from about 27% to about 39% $H_3PO_4$, less than about 20% of at least one magnesium compound selected from the group comprising $MgCO_3$ and MgO, and aluminum in an amount sufficient to substantially equilibrate said bonding solution with respect to aluminum.

2. The coating composition, as set forth in claim 1, wherein said bonding solution contains from about 0.5% to about 3.5% aluminum in solution.

3. The coating composition, as set forth in claim 1, wherein said bonding solution consists essentially of, by weight, about 62% $H_2O$, about 27% $H_3PO_4$, about 9% $MgCO_3$, and about 1% aluminum in solution.

4. The coating composition, as set forth in claim 1, wherein said bonding solution consists essentially of, by weight, about 65% $H_2O$, about 28% $H_3PO_4$, about 5% MgO, and about 1% aluminum in solution.

5. The coating composition, as set forth in claim 1, wherein the ratio of the aluminum powder component of the slurry mixture is about 125 g to each 100 ml of the bonding solution.

6. The coating composition, as set forth in claim 1, wherein said aluminum powder component of the slurry mixture is an atomized aluminum powder having a mean particle size of less than about 45 $\mu$m.

7. The coating composition, as set forth in claim 6, wherein said atomized aluminum powder has a mean particle size of from about 3 $\mu$m to about 8 $\mu$m.

8. A method of forming a slurry coating for ferrous alloy surfaces, comprising the steps of:
    mixing together from about 500 to about 800 parts by weight of water and 345 parts by weight phosphoric acid;
    adding an aluminum compound, selected from the group consisting of metallic aluminum powder, aluminum oxide and aluminum hydroxide, in an amount sufficient to substantially equilibrate said bonding solution with respect to aluminum;
    adding from 0 about 200 parts by weight of at least one magnesium compound selected from the group to form a mixture consisting of magnesium carbonate and magnesium oxide;
    stirring said mixture for a period of time sufficient to permit the substantially complete reaction of said added compounds with phosphoric acid; and thereby forming a neutralized solution that is substantially equilibrated with respect to aluminum;
    mixing said neutralized solution with atomized aluminum powder in an amount sufficient to form a slurry containing from about 80 g to about 150 g of aluminum powder for each 100 ml of the neutralized solution.

9. A method of forming a slurry coating, as set forth in claim 8, wherein said aluminum compound is added in an amount sufficient to provide from about 0.5% to about 3.5% aluminum in solution.

10. A method of forming a slurry coating, as set forth in claim 8, wherein said aluminum compound added to said mixture is from about 10 to about 70 parts by weight atomized aluminum powder.

11. A method of forming a slurry coating, as set forth in claim 8, wherein said atomized aluminum powder mixed with said neutralized bonding solution has a mean particle size of less than about 45 $\mu$m.

12. A method of forming a slurry coating, as set forth in claim 8, wherein the step of adding at least one magnesium compound to said mixture comprises adding less than about 200 parts by weight of magnesium carbonate.

13. A method of forming a slurry coating, as set forth in claim 8, wherein the step of adding at least one magnesium compound to said mixture comprises adding less than about 100 parts by weight of magnesium oxide.

14. A method of forming a slurry coating, as set forth in claim 8, wherein said aluminum powder is mixed with said neutralized solution in an amount sufficient to form a slurry containing about 125 g of aluminum powder for each 100 ml of said neutralized solution.

* * * * *

UNITED STATES PATENT AND TRADEMARK OFFICE
CERTIFICATE OF CORRECTION

PATENT NO. : 5,242,488

DATED : September 7, 1993

INVENTOR(S) : Alvin R. Stetson et al.

It is certified that error appears in the above-identified patent and that said Letters Patent is hereby corrected as shown below:

Claim 8, column 6, line 5, before "to", insert --consisting of magnesium carbonate and magnesium oxide--; and after "mixture", delete "consisting of magnesium carbonate and magnesium oxide".

Signed and Sealed this

Sixteenth Day of May, 1995

Attest:

BRUCE LEHMAN

*Attesting Officer*      *Commissioner of Patents and Trademarks*